United States Patent [19]

Catlow

[11] Patent Number: 4,767,271
[45] Date of Patent: Aug. 30, 1988

[54] GAS TURBINE ENGINE POWER TURBINE

[75] Inventor: Ronald Catlow, Derby, England

[73] Assignee: Rolls-Royce plc, London, England

[21] Appl. No.: 49,552

[22] Filed: May 14, 1987

[30] Foreign Application Priority Data

Jul. 2, 1986 [GB] United Kingdom ............... 8616152

[51] Int. Cl.⁴ .............................................. B64C 11/48
[52] U.S. Cl. .................................... 416/129; 416/171;
416/193 R; 415/65; 415/69
[58] Field of Search .................... 416/171, 193 R, 122,
416/128, 127, 129, 230 R, 225; 415/62, 65, 68,
91; 60/268, 39.16, 226.1

[56] References Cited

U.S. PATENT DOCUMENTS

| | | | |
|---|---|---|---|
| 2,026,885 | 1/1936 | Goddard | 416/129 X |
| 2,411,124 | 11/1940 | Baumann | 416/171 X |
| 2,478,206 | 8/1949 | Redding | 416/171 X |
| 2,505,660 | 4/1950 | Baumann | 416/171 X |
| 2,514,408 | 7/1950 | Mierley | 416/194 |
| 2,541,098 | 2/1951 | Redding | 60/268 X |
| 2,919,889 | 1/1960 | Rubel | 416/225 X |
| 2,937,495 | 5/1960 | Perry | 60/268 X |
| 2,971,745 | 2/1961 | Warren et al. | 416/193 |
| 3,070,284 | 12/1962 | Kent | 416/171 |
| 3,363,419 | 1/1968 | Wilde | 416/171 X |
| 3,494,539 | 2/1970 | Littleford | 416/193 R X |
| 3,768,933 | 10/1973 | Bouiller et al. | 416/193 R X |
| 3,811,791 | 5/1974 | Cotton | 416/171 X |
| 4,621,978 | 11/1986 | Stuart | 416/171 X |
| 4,643,647 | 2/1987 | Perry | 416/230 |
| 4,657,484 | 4/1987 | Wakeman et al. | 416/171 X |
| 4,685,864 | 8/1987 | Angus et al. | 416/230 X |

FOREIGN PATENT DOCUMENTS

| | | | |
|---|---|---|---|
| 259296 | 6/1949 | Switzerland | 416/171 |
| 588096 | 5/1947 | United Kingdom | 416/127 |
| 1251955 | 11/1971 | United Kingdom | 416/160 |
| 2129502 | 5/1984 | United Kingdom | 60/268 |

OTHER PUBLICATIONS

Aerospace America; Oct. 1984; pp. 52-55.

*Primary Examiner*—Everette A. Powell, Jr.
*Attorney, Agent, or Firm*—Cushman, Darby & Cushman

[57] ABSTRACT

A power turbine suitable for a gas turbine engine which a blade of one array of turbine blades has a fan propulsion blade attached to its radially outer extent. A drum member is further provided which carries at least one further annular array of turbine blades and is coaxially interposed between the arrays of turbine blades and fan propulsion blades to rotate with the same in operation. Aperatures are defined through the drum member to accommodate the attachment structure provided between the turbine blade and the fan propulsion blades such that relative radial movement is permitted between the turbine blade and the drum.

9 Claims, 3 Drawing Sheets

4,767,271

GAS TURBINE ENGINE POWER TURBINE

This invention relates to a gas turbine engine power turbine.

One form of gas turbine engine suitable for aircraft propulsion comprises a core gas turbine engine of conventional construction which has a power turbine located at its downstream end. The power turbine comprises axially alternate annular arrays of contra-rotatable turbine blades which are drivingly connected to contra-rotatable aerofoil propulsion blades which may or may not be enclosed within a duct defined by suitable cowling. Essentially the exhaust efflux from the core gas turbine engine is directed into the power turbine so as to cause contra-rotation of the turbine blades and hence the aerofoil propulsion blades to provide propulsive thrust.

In one convenient form of construction for such a power turbine, the aerofoil propulsion blades are positioed radially outwardly of the contra-rotatable turbine blades. However, this gives rise to difficulties in the provision of an effective connection with the necessary degree of mechanical integrity between the turbine blades and the aerofoil propulsion blades.

A further difficulty with such a form of construction arises if axially alternate annular arrays of turbine blades of the power turbine are attached at their radially outer extents to drum member which serves the dual role of defining a portion of the radially outer extent of the gas passage through the power turbine and a portion of the radially inner boundary to the air flow over the aerofoil propulsion blades. The drum member is necessarily interposed between the contra-rotatable blades of the power turbine and the aerofoil propulsion blades and there is therefore great difficulty in ensuring the mechanical integrity of the assembly. If, for instance the aerofoil propulsion blades were directly attached to the drum member, the drum member would have to be of extremely robust, and therefore heavy construction in order to withstand the loads imposed upon it. Moreover difficulty would be encountered in ensuring that the drum member remained stiff and circular to provide stable concentricity of the power turbine/propulsion blade assembly.

In an alternative form of construction the aerofoil propulsion blades may be directly attached to the radially outer extents of appropriate annular arrays of power turbine blades with the drum member configured with suitable apertures to permit such a form of attachment. The drawback with such an arrangement, however, is that if a turbine blade should fail than the aerofoil propulsion blade attached to it would be lost.

It is an object of the present invention to provide a power turbine assembly in which such difficulties are substantially avoided.

According to the present invention a power turbine suitable for a gas turbine engine comprises an annular array of radially extending turbine rotor blades, the radially inner extent of each of which is attached to means journalled for rotation about the longitudinal axis of said power turbine, and the radially outer extent of each of which is provided with attachment means attaching it to the radially inner extent of an aerofoil propulsion blade, and a drum member carrying at least one further annular array of turbine rotor blades which drum member is coaxially interposed between the arrays of said turbine rotor blades and aerofoil propulsion blades to operationally rotate therewith, said drum member having apertures to accommodate said attachment means whereby relative radial movement is permitted between said turbine rotor blades and said drum member, said aerofoil propulsion blades and said drum member being interconnected in such a manner that limited relative radial movement is permitted between them up to a limit at which said drum member provides at least partial radial support for any of said aerofoil propulsion blades.

The invention will now be described, by way of example, with reference to the accompanying drawings in which.

Figure 1:
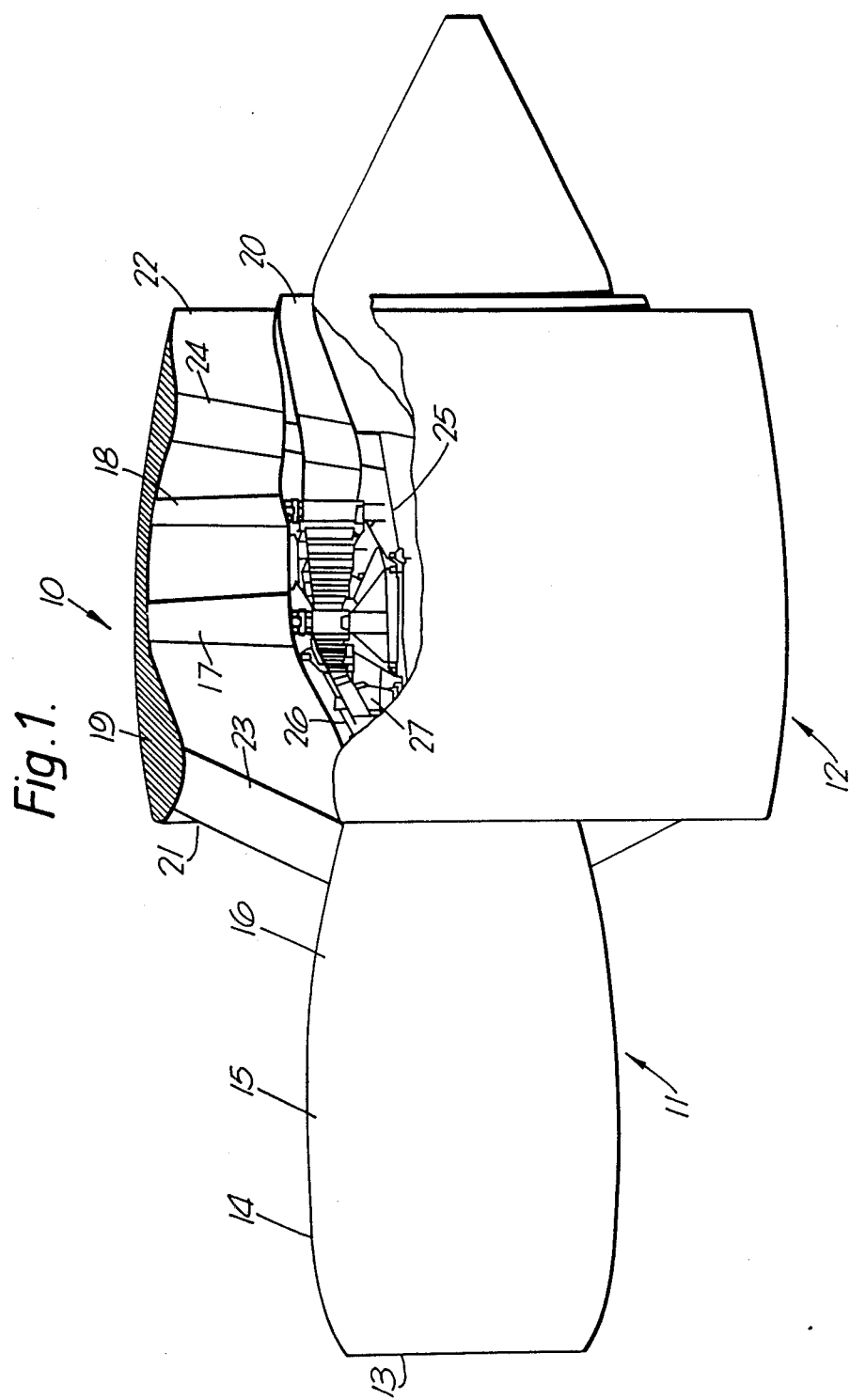
FIG. 1 is a partially broken away side view of a gas turbine engine having a power turbine in accordance with the present invention.

With reference to FIG. 1 a ducted fan gas turbine engine generally indicated at 10 comprises a core engine 11 having a power turbine 12 located at its downstream end. The core engine 11 is of conventional construction in that it comprises an air intake 13, a compressor section 14, combustion equipment 15 and a turbine 16. The core engine 11 functions in a conventional manner whereby air taken in through the intake 13 is compressed by the compressor section 14 before being mixed with fuel and the mixture combusted in the combustion equipment 15. The resultant combustion products expand through the turbine 16 before being exhausted into the power turbine 12.

The power turbine 12 is not of conventional construction in that it comprises a number of stages of contra-rotating turbine blades, two stages of which have upstream and downstream fan aerofoil blades 17 and 18 respectively attached to their radially outer extents. The fan blades 17 and 18 contra-rotate and are enclosed by a fan cowling 19.

In operation hot gases exhausted from the core engine 11 are directed into the power turbine 12 to provide contra-rotation of the turbine blades thereof and in turn contra-rotation of the fan blades 17 and 18. A certain amount of propulsive thrust is provided by the gases exhausted from the power turbine 12 through the annular outlet duct 20. However the majority of the propulsive thrust of the gas turbine engine 10 is provided by air which has been drawn in at the upstream end 21 of the fan duct and accelerated by the contra-rotating fan blades 17 and 18 before being exhausted from the downstream end 22 of the fan cowling 19.

The fan cowling 19 and the core engine 11 are interconnected by a plurality of generally radially extending forward struts 23 while a plurality of generally radially extending rearward struts 24 interconnect the fan cowling 19 with the remainder of the power turbine 12. The rearward struts 24 facilitate the majority of the load transfer between the engine 10 and the aircraft on which it is in operation mounted (not shown) and are attached at their radially inner ends to the axially downstream end of a generally cylindrical support member 25 which is located coaxially within the power turbine 12. The cylindrical support member 25 carries all of the contra-rotating elements of the power turbine 12 and is attached at its upstream end to the downstream end of the casing 26 of the core engine 11 by means of a load transfer structure generally indicated at 27.

Figure 2:
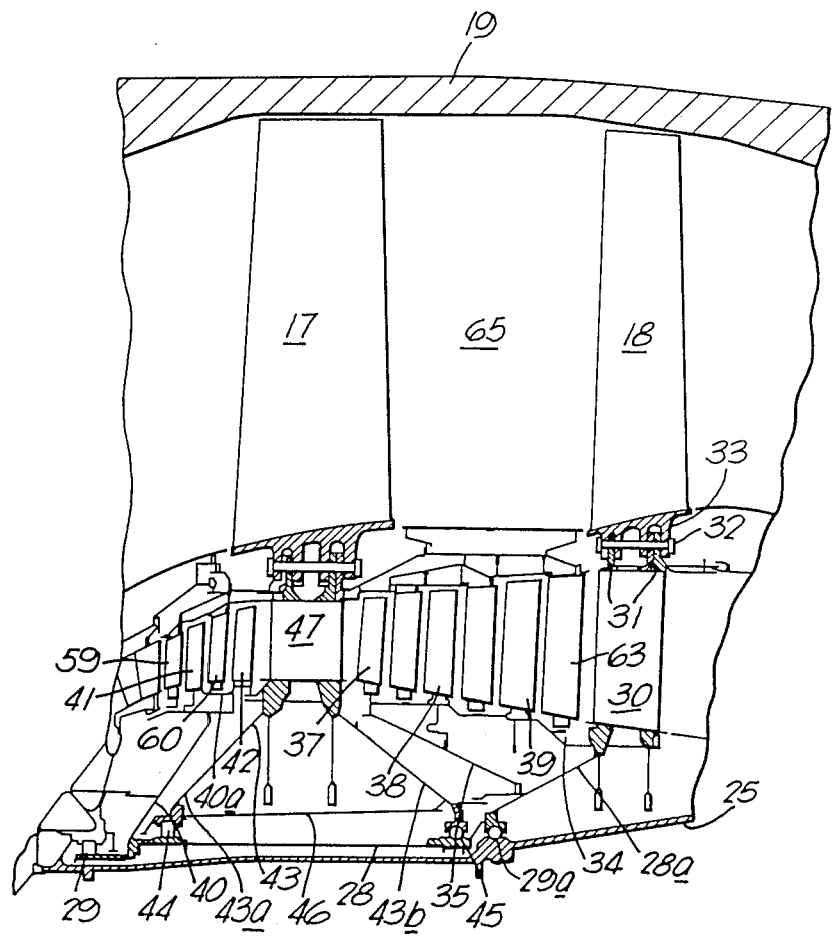
FIG. 2 is a sectioned side view of a potion of the power turbine shown in FIG. 1.

The support member 25, has, as can be seen in FIG. 2, a shaft 28 journalled coaxially thereon by means of two axially spaced apart sets of bearings 29 and 29a. The shaft 28 has a portion 28a of frusto-conical form at its downstream end which carries an annular array of radially extending turbine blades 30. Each turbine blade 30 is provided at its radially outer extent with two axially spaced apart radially extending apertured lugs 31. The lugs 31 carry a pin 32 which in turn locates within four axially spaced apart radially extending apertured lugs 33 provided on the radially inner end of a corresponding downstream fan blade 18.

The frusto-conical shaft portion 28a has further generally frusto-conical shaft portions 34 and 35 attached thereto. The frusto-conical shaft portion 35 is located radially inwardly of and serves to support the upstream end 36 of the frusto-conical shaft portion 34. The frusto-conical shaft portion 34 carries the radially inner extents of three annular arrays of turbine blades 37, 38 and 39 and additionally serves to define a radially inner portion of the tubine exhaust gas passage through the power turbine 12.

The upstream end of the shaft 28 is also provided with a frusto-conical portion 40 which serves to carry two annular arrays of radially extending turbine blades 41 and 42 and annular structure 40a which defines a further radially inner portion of the turbine exhaust passage through the power turbine 12. It will be seen therefore that rotation of the shaft 28 results in the corresponding rotation of the turbine blade arrays 30, 37, 38, 39, 41 and 42 as well as the array of downstream fan blades 18.

The shaft 28 has a further shaft 43 journalled coaxially thereon by two axially spaced apart bearings 44 and 45. The shaft 43 consists essentially of two frusto-conical portions 44 and 45 which are linked at their radially inner extents by a cylindrical member 46.

The frusto-conical shaft portions 44 and 45 are attached at their radially outer extents to the radially inner extents of an array of turbine blades 47.

Figure 3:
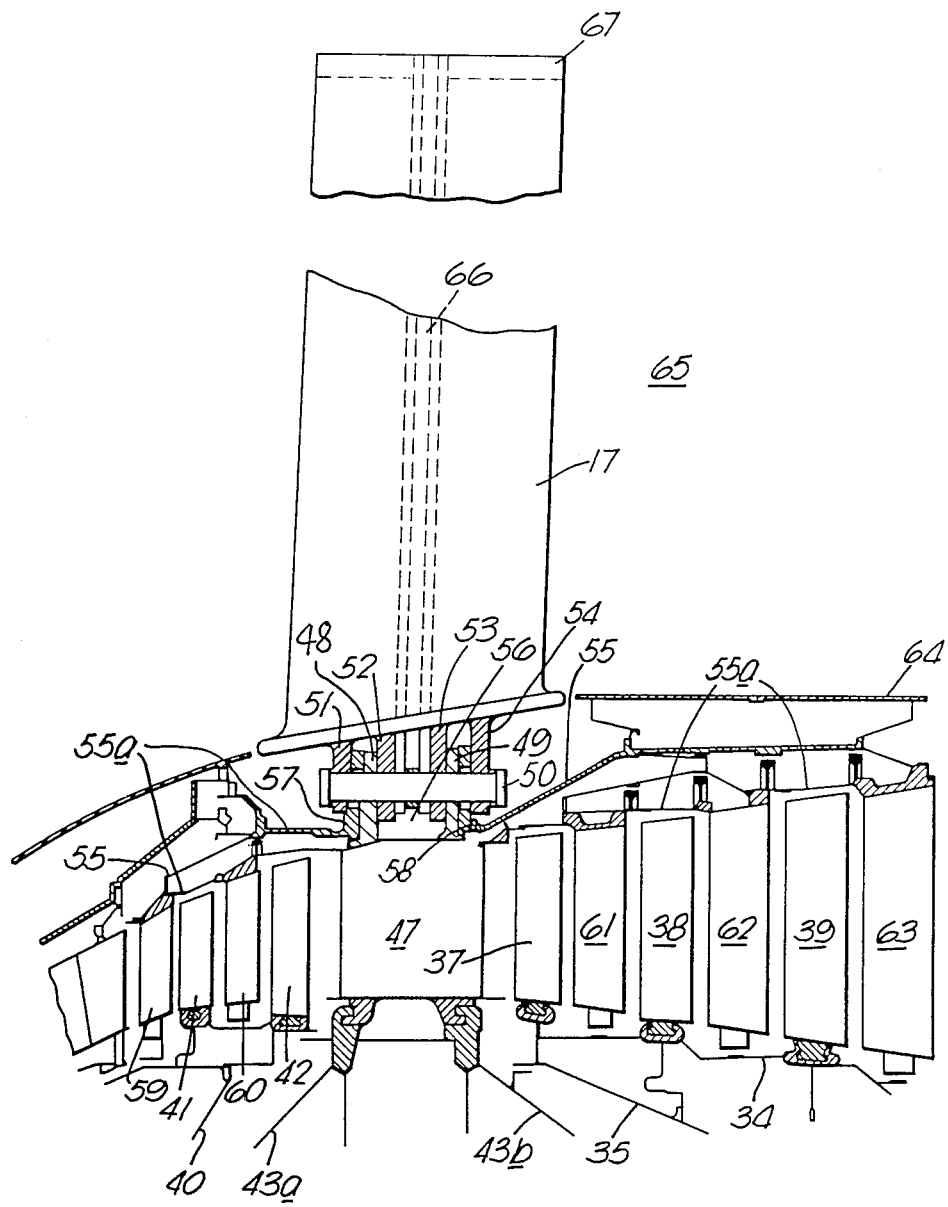
FIG. 3 is an enlarged view of a portion of the power turbine shown in FIG. 2.

Each of the turbine blades 47 as can be seen more clearly in FIG. 3 is provided at its radially outer extent with two axially spaced apart radially extending apertured lugs 48 and 49. The apertures in the lugs 48 and 49 carry a pin 50 which locates in turn in apertures provided in axially spaced apart radially extending lugs 51, 52, 53 and 54 provided on the radially inner end of an upstream fan blade 17.

A drum member 55 which extends both upstream and downstream of the turbine blades 47 is coaxially interposed between the turbine blades 47 and fan blades 17 so as to rotate therewith. The drum member 55 is provided with apertures 56 which correspond with the lugs 48 and 49 on the radially outer extents of each of the turbine blades 47 so as to permit direct attachment of the fan blades 17 to corresponding turbine blades 47. The apertures 56 are provided at their upstream and downstream edges with apertured lugs 57 and 58 through which the pins 50 extend. The apertures in the lugs 57 and 58 are of greater diameter than that of the pin 50 so that limited relative radial movement arising through temperature differences is permitted between the primary drum member 15 and the turbine blades 47 up to a limit at which the drum member 55 provides at least partial radial support for any of the fan blades 17. It will be seen therefore that the cooperation of the lugs 48 and 49 with the apertures 56 ensures that the drum member 55 is maintained in coaxial relationship with the axis of the power turbine 12 and that the turbine blade arrays 59, 60, 61, 62 and 63 drive the fan blades 17.

The upstream end of the drum member 55 serves to support the radially outer extents of two annular arrays of turbine blades 59 and 60 which are interposed between the turbine blades 41 and 42. Likewise the downstream portion of the drum member 55 serves to support the radially outer extents of three annular arrays of turbine blades 61, 62 and 63 which are interposed between the turbine blades 37, 38 and 39 respectively. The drum member 55 additionally serves to provide structure 55a which defines a radially outer portion of the turbine exhaust gas passage through the power turbine 12.

The radially outer extent of the downstream end of the drum member 55 has a boundary defining cylinder 64 attached thereto which serves to define a portion of the radially inner boundary of the gas passage 65 which contains the fan blades 17 and 18 and is enclosed by the cowling 19.

It will be seen therefore that rotation of the shaft 43 results in the rotation of the annular array of turbine blades 47, the drum member 55, the annular arrays of turbine blades 59, 60, 61, 62 and 63 and of the annular array of upstream fan blades 17.

Each fan blade 17 is hollow and contains radially extending fibres 66 of an aramid material which are bonded to the tip region 67 of the fan blade 17 and are anchored at their radially inner extents to the pin 50. Although only two tows of fibres 66 are shown in the drawing it will be appreciated that further tows may be distributed throughout the fan blade 17 and attached at appropriate positions to the pin 50. similar fibres may be provided within the fan blades 18 and anchored to the pins 32. The fibres 66 are not normally load carrying. However in the event of a structural failure of any of the fan blades 17 or 18, the fibres 66 serve to ensure that no pieces of the fan blades 17 or 18 are lost to cause damage to the engine 10 or the aircraft on which it is mounted.

The turbine blade arrays within the power turbine 12 are so configured that alternate arrays contra-rotate so that the shafts 28 and 43 contra-rotate as do the arrays of fan blades 17 and 18 to provide propulsive thrust.

It will be seen therefore that the annular array of turbine blades 47 support the upstream fan blades 17 and additionally serve to lcoate the drum member 55 and its turbine blade arrays 59, 60, 61, 62 and 63 so that they rotate therewith and thereby drive the fan blades 17.

The arrangement of the present invention brings about certain advantages. Firstly the turbine blades 47, drum member 55 and the radially inner extents of the fan blades 17 provide a stiff circular base which ensures stable concentricity of the whole assembly. Secondly there is a direct radial load path between each fan blade 17 and the turbine blade 47 which carries it. Thirdly axial torsional restraint of the giro-couple of the fan blades 17 is achieved thereby reducing concentration at the turbine blade 47 root fixing. Fourthly in the event of a failure of one of the turbine blades 47 the corresponding fan blade 17 positioned radially outwardly thereof is retained in position by means of its attachment to the drum member 55 by the pin 50 so that the fan blade 17 is not lost. Finally the drum member 55 provides supplementary hoop restraint to the fan blade array 17 when the power turbine 12 is running in its upper power range.

Although the present invention has been described with respect to a ducted fan engine, it will be appreciated that the invention is equally applicable a gas turbine engine having a power turbine which powers contra-rotating propeller blades, that is to say blades which are not retained within a fan cowling.

I claim:

1. A power turbine suitable for a gas turbine engine comprising an annular array of radially extending turbine rotor blades, means journalled for rotation about the longitudinal axis of said power turbine, the radially inner extent of each of said turbine rotor blades being attached to said means journalled for rotation, an annular array of aerofoil propulsion blades, the radially outer extent of each of said turbine rotor blades being provided with attachment means attaching it to the radially inner extent of one of said aerofoil propulsion blades, a drum member, and at least one further annular array of turbine rotor blades carried by said drum member, said drum member being coaxially interposed between the arrays of said turbine rotor blades and aerofoil propulsion blades to operationally rotate therewith, said drum member having apertures to accommodate said attachment means whereby relative radial movement is permitted between said turbine rotor blades and said drum member, said aerofoil propulsion blades and said drum member being interconnected in such a manner that limited relative radial movement is permitted between them up to a limit at which said drum member provides at least partial radial support for any of said aerofoil propulsion blades.

2. A power turbine as claimed in claim 1 in which said attachment means comprises apertured lugs provided on each of said turbine rotor blades and said aerofoil propulsion blades, said lugs of each said turbine rotor blade and its corresponding aerofoil propulsion blade being interconnected by a pin member located in the apertures of said lugs.

3. A power turbine as claimed in claim 2 wherein said drum member is additionally provided with lugs having apertures in which said pin members locate, the apertures in said drum member lugs being larger than those in said other lugs so as to facilitate said limited relative radial movement between said aerofoil propulsion blades and said drum member.

4. A power turbine as claimed in claim 1 wherein said power turbine comprises further turbine blade arrays axially interposed between and adapted to contra-rotate with said first array of turbine blades and said turbine blades carried by said drum member.

5. A power turbine as claimed in claim 4 wherein said further turbine arrays adapted to contra-rotate with said first array of turbine blades and said turbine blades carried by said drum member are drivingly attached to a second annular array of radially extending aerofoil propulsion blades.

6. A power turbine as claimed in claim 5 wherein said additional annular array of aerofoil propulsion blades is located downstream of said aerofoil propulsion blades attached to said first array of turbine blades.

7. A power turbine as claimed in any one preceding claim wherein said aerofoil propulsion blades are enclosed by a cowling.

8. A power turbine as claimed in claim 1 wherein said drum member comprises mean defining a portion of the radially inner boundary to the airflow operationally passing over said aerofoil propulsion blades.

9. A power turbine as claimed in any one proceding claim wherein each of said aerofoil propulsion blades is hollow and contains filaments which interconnect the blade tip thereof with said attachment means at the radially outer extent of its corresponding turbine rotor blade.

* * * * *